(12) United States Patent
Park et al.

(10) Patent No.: US 8,700,697 B2
(45) Date of Patent: Apr. 15, 2014

(54) METHOD AND APPARATUS FOR ACQUIRING RUI-BASED SPECIALIZED CONTROL USER INTERFACE

(75) Inventors: Ho-Yeon Park, Seoul-si (KR); Jun-Hyung Kim, Suwon-si (KR); Ji-Eun Keum, Suwon-si (KR); Bo-Sun Jung, Sungnam-si (KR)

(73) Assignee: Samsung Electronics Co., Ltd (KR)

( * ) Notice: Subject to any disclaimer, the term of this patent is extended or adjusted under 35 U.S.C. 154(b) by 407 days.

(21) Appl. No.: 12/627,910

(22) Filed: Nov. 30, 2009

(65) Prior Publication Data

US 2011/0131505 A1      Jun. 2, 2011

(51) Int. Cl.
   G06F 15/16      (2006.01)
(52) U.S. Cl.
   USPC ......................................................... 709/203
(58) Field of Classification Search
   USPC .................................................. 709/203, 223
   See application file for complete search history.

(56) References Cited

U.S. PATENT DOCUMENTS

| | | | |
|---|---|---|---|
| 2007/0005727 A1* | 1/2007 | Edwards et al. | 709/218 |
| 2007/0112958 A1 | 5/2007 | Kim | |
| 2007/0210908 A1* | 9/2007 | Putterman et al. | 340/506 |
| 2007/0222702 A1* | 9/2007 | Toya | 345/1.1 |
| 2009/0030931 A1* | 1/2009 | Khivesara et al. | 707/102 |
| 2009/0210488 A1 | 8/2009 | Lee | |
| 2009/0265422 A1 | 10/2009 | Park et al. | |
| 2009/0307658 A1* | 12/2009 | Freitas et al. | 717/113 |
| 2010/0182438 A1* | 7/2010 | Mohammed | 348/207.11 |
| 2011/0138327 A1* | 6/2011 | Scott et al. | 715/810 |

OTHER PUBLICATIONS

CEA Standard, Web-Based Protocol and Framework for Remote User Interface on UPnP Networks and the Internet (Web4CE), CEA-2014-A, Jul. 2007.

International Standard, Information Technology—User Interfaces—Universal Remote Console, Part 1: Framework, ISO/IEC 24752-1, First Edition, Feb. 15, 2008.

* cited by examiner

*Primary Examiner* — Jason Recek (74) *Attorney, Agent, or Firm* — The Farrell Law Firm, P.C.

(57) ABSTRACT

Methods and apparatuses are provided for acquiring a specialized Control User Interface (CUI) in a remote control device of home network. A first message is transmitted to a client requesting a User Interface (UI) list. The UI list is received from the client. The UI list comprises specialized CUI information from a server. A second message is transmitted to the client requesting the specialized CUI in accordance with the specialized CUI information in the UI list. The specialized CUI is received from the server via the client.

19 Claims, 9 Drawing Sheets

```xml
<?xml version="1.0" encoding="UTF-8"?>
<uilist Xmlns="urn:schemas-upnp-org:remoteui:uilist-1-0"
xmlns:xsi="http://www.w3.org/2001/XMLSchema-instance" xsi:schemaLocation="urn:schemas-upnp-
org:remoteui:uilist-1-0 CompatibleUIs.xsd">
    <!--UI element for speecialized UI-->
    <ui>
        <uiID>4560-9876-1265-8758</uiID>
        <name>specialized CUI</name>
        <description>This isfor the speecialized CUI</description>
        <protocol shortName="CE-HTML-1.0">
            <uri>http://1.3.4.5:5910/</uri>   ──►  http://RUIC_ADDRESS:PORT/request_cui
            <protocolInfo>
            <!--include server capability description schema of Anne x D-->
            <relatedData xmlns="urn:schemas-ceorg:ce-html-server-caps-1-0"
                xsi:schemaLocation="urn:schemas-ceorg:ce-html-server-caps-1-0 ServerProfiles.xsd">
                <profilelist>
                    <ui_profile name="MD_UIPROF"/>
                </profilelist>
            </relatedData>
            </protocolInfo>
        </protocol>
    </ui>
    <!--UI element list for Default CUI-->
    . . . .
</uilist>
```

FIG. 9

METHOD AND APPARATUS FOR ACQUIRING RUI-BASED SPECIALIZED CONTROL USER INTERFACE

BACKGROUND OF THE INVENTION

1. Field of the Invention

The present invention relates generally to Control User Interface (CUI) acquisition, and more particularly, to methods and apparatus for acquiring a specialized CUI for a Remote User Interface (RUI) running in a device.

2. Description of the Related Art

A number of industrial standard organizations, such as Digital Living Network Alliance (DLNA), Home Audio-Video Interoperability (HAVI), and Universal Plug and Play (UPnP), are currently developing various technologies relating to home networks. RUI technology is utilized in home networks to control diverse device functions in accordance with a client-server architecture. Specifically, an RUI Client (RUIC) may acquire a CUI from an RUI Server (RUIS) and use the acquired CUI to control an RUI on the RUIC.

Figure 1:
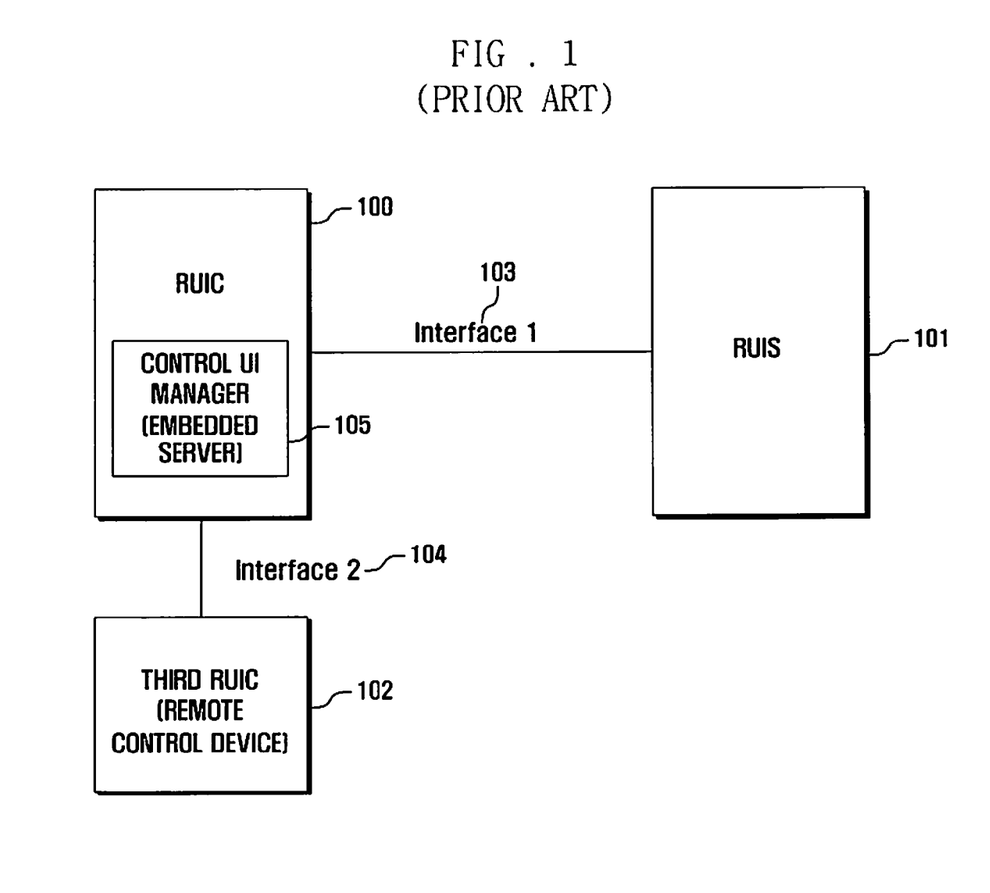
FIG. 1 is a diagram illustrating a conventional system in which an RUIC is controlled by remote control device.

FIG. 1 is a diagram illustrating a conventional system in which an RUIC is controlled by another RUIC, or remote control device. RUIC 100 receives an RUI and control information from an RUIS 101 via a first protocol interface 103. The RUI is provided for presentation in the RUIC 100, and the control information includes, for example, information for controlling the RUI. A CUI is separated from the received control information and transferred to a remote control device 102 by a CUI manager 105 via a second protocol interface 104. The CUI is presented in the remote control device 102 such that a user of the remote control device 102 is able to control the RUIC 100 via the CUI presented in the remote control device 102, or via the RUI presented on the RUIC 100.

Figure 2:
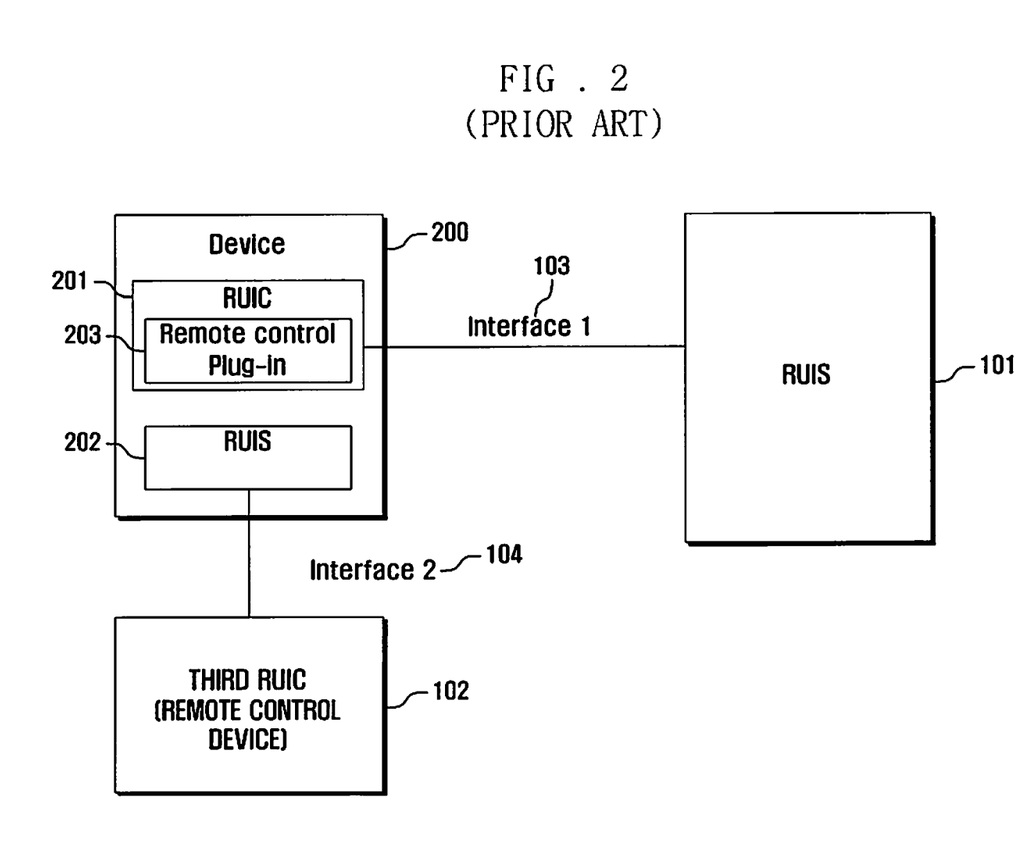
FIG. 2 is a diagram illustrating another conventional system in which an RUIC is controlled by remote control device.

The CUI manager 105 is a logical entity that can be implemented inside or outside of the RUIC 100. FIG. 2 is a diagram illustrating another conventional system in which an RUIC is controlled by a remote control device. A device 200 is shown, which includes an RUIC 201 and an RUIS 202. The RUIC 201 receives the RUI and control information from the RUES 101 via the first protocol interface 103. A remote control plug-in 203 functions in the RUIC 201. The CUI manager is implemented as an entity that is outside of the RUIC 201, specifically as CEA-2014 RUIS 202. The RUIS 202 separates the CUI from the received control information, and transfers the CUI to the remote control device 102 via the second protocol interface 104.

Figure 3:
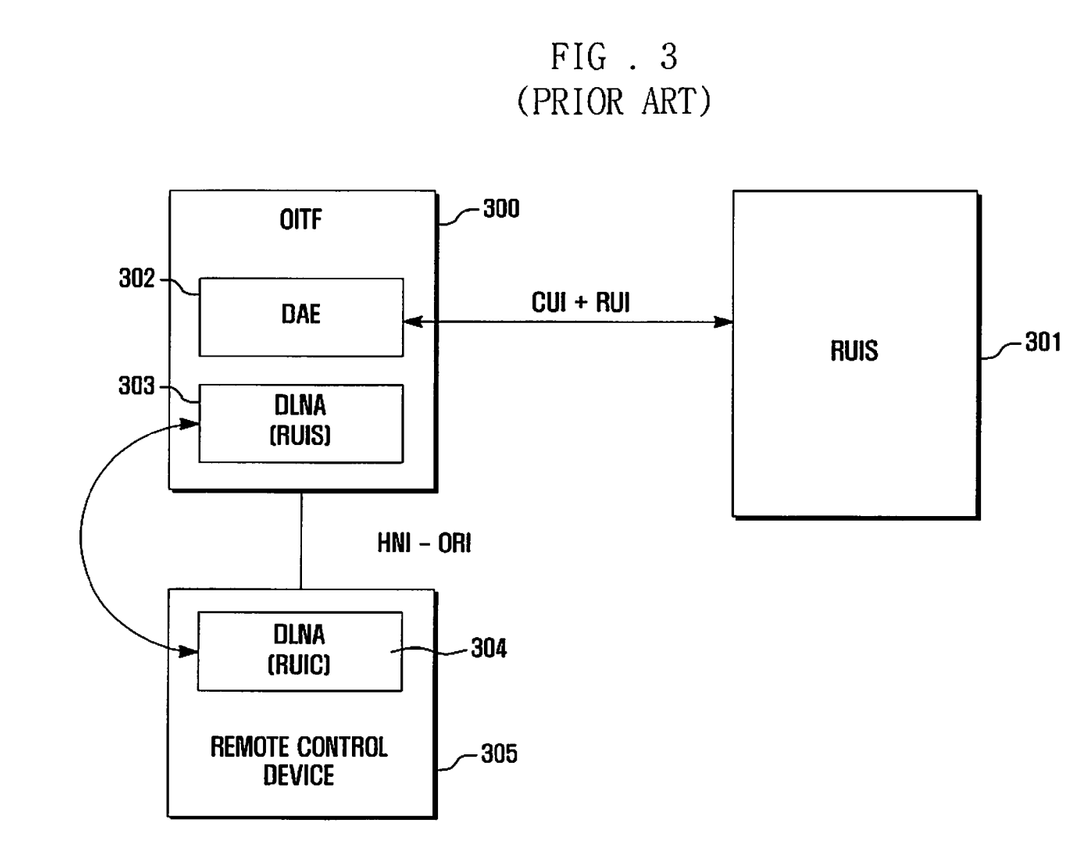
FIG. 3 is a diagram illustrating a conventional system in which an OITF device is controlled by a remote control device.

FIG. 3 is a diagram illustrating a conventional system in which an Open Internet Protocol (IP) Television Forum (OITF) device is controlled by a remote control device. An RUIS 301 provides CUI and RUI information to a Declarative Application Environment (DAE) 302 of an OITF 300. A DLNA RUIS 303 is also included in the OITF 300 separate from the DAE 302. The DLNA RUIS 303 communicates with a DLNA RUIC 304 in a remote control device 305, and transfers the CUI to the remote device 305 via a DLNA RUI (HNI-ORI).

Figure 4:
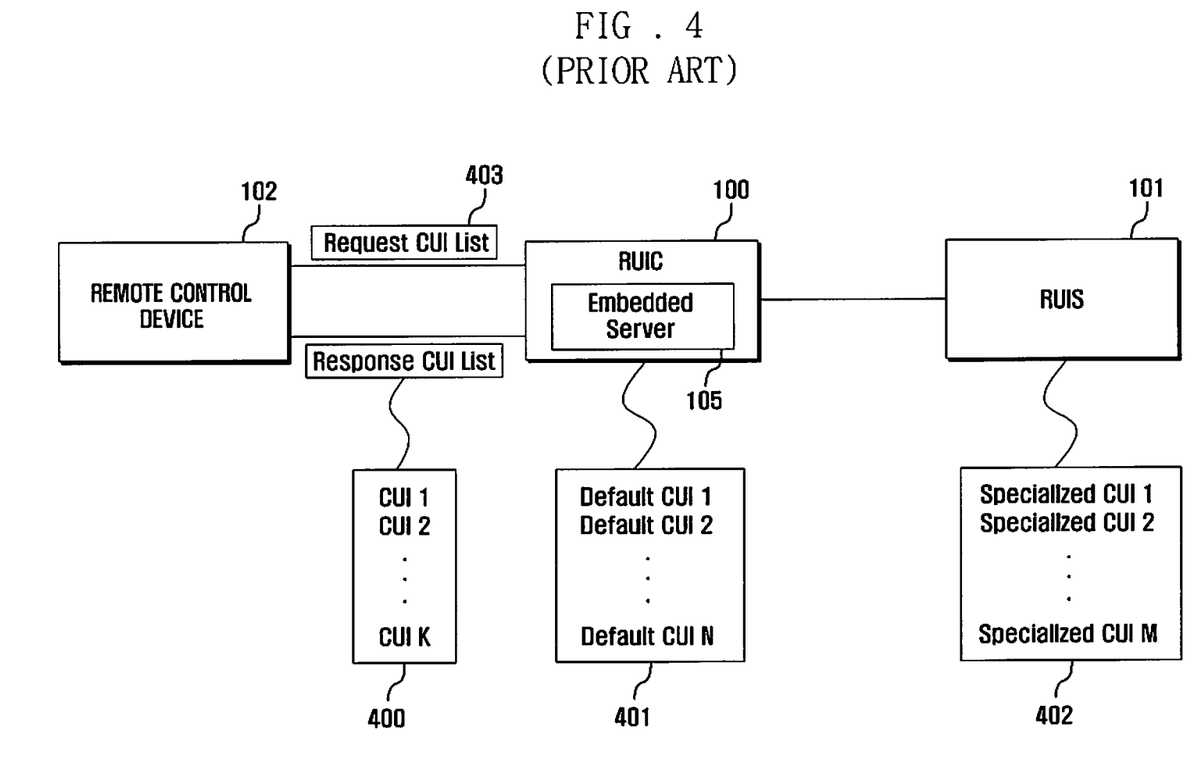
FIG. 4 is a diagram illustrating a conventional home network system.

FIG. 4 is a diagram illustrating a conventional home network system. In order for the remote control device 102 to obtain a CUI, the remote control device 102 first extracts a User Interface (UI) list Uniform Resource Locator (URL) from description information received from the RUIC 100. The remote control device then sends a request 403 for a CUI list to the RUIC 100. An embedded server, or CUI manager 105, of the RUIC 100 provides the remote control device 102 with the CUI list 400 in an eXtensible Markup Language (XML) format. However, the XML CUI list 400 contains only the default CUI list 401 of the RUIC 100, instead of a specialized CUI list 402 from the RUIS 101.

SUMMARY OF THE INVENTION

The present invention has been made to address at least the above problems and/or disadvantages and to provide at least the advantages described below. Accordingly, an aspect of the present invention provides method and apparatus for acquiring a specialized CUI for a running RUI.

According to one aspect of the present invention, a method is provided for acquiring a specialized Control User Interface (CUI) in a remote control device of home network. A first message is transmitted to a client requesting a User Interface (UI) list. The UI list is received from the client. The UI list comprises specialized CUI information from a server. A second message is transmitted to the client requesting the specialized CUI in accordance with the specialized CUI information in the UI list. The specialized CUI is received from the server via the client.

According to another aspect of the present invention, a method is provided for acquiring a specialized Control User Interface (CUI) for a remote control device at a client of a home network. A first message is received from the remote control device requesting a User Interface (UI) list. The UI list comprising specialized CUI information is generated. The UI list is transmitted to the remote control device. A second message is received from the remote control device requesting the specialized CUI in accordance with the specialized CUI information in the UI list. The specialized CUI is acquired for the remote control device from the server.

According to an additional aspect of the present invention, a remote control device of a home network is provided. The remote control device includes a transmitter for transmitting a first message to a client requesting a User Interface (UI) list, and a second message to the client requesting the specialized CUI in accordance with specialized CUI information in the UI list to acquire the specialized CUI from the server via the client. The remote control device also includes a receiver for receiving the UI list from the client, wherein the UI list comprises the specialized CUI information from a server, and the specialized CUI from the server via the client.

According to a further aspect of the present invention, a client of a home network is provided. The client includes an embedded server for receiving a first message from the remote control device requesting a User Interface (UI) list, generating the UI list comprising specialized CUI information, transmitting the UI list to the remote control device and receiving a second message from the remote control device requesting the specialized CUI in accordance with the specialized CUI information in the UI list, and acquiring the specialized CUI from the server for the remote control device.

According to another aspect of the present invention, a system for acquiring a specialized Control User Interface (CUI) is provided. The system includes a remote control device for transmitting a first message requesting a User Interface (UI) list, receiving the UI list, wherein the UI list comprises specialized CUI information, transmitting a second message requesting the specialized CUI in accordance with the specialized CUI information in the UI list, and receiving the specialized CUI. The system also includes a client for receiving the first message from the remote control device, generating the UI list, transmitting the UI list to the remote control device, receiving the second message from the remote control device, and acquiring the specialized CUI for the remote control device from the server. The system further includes the server for providing specialized CUI information for the generation of the UI list and providing the specialized CUI for the remote control device via the client.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

In the following description, an RUIC receives an RUI for presentation in the RUIC and CUIs for controlling the RUI from an RUIS. A remote control RUIC device controls the RUIC using a CUI provided by the RUIC or the RUIS. The remote control device can be implemented as a mobile device or another portable device, such as a small display device having a communication function.

In an embodiment of the present invention, CUIs that are used for controlling the RUI rendered in an RUIC are classified in default CUIs and specialized CUIs. Thus, a user can select a specialized CUI through the remote control device and acquire the selected specialized CUI from the RUIS via the RUIC.

Figure 5:
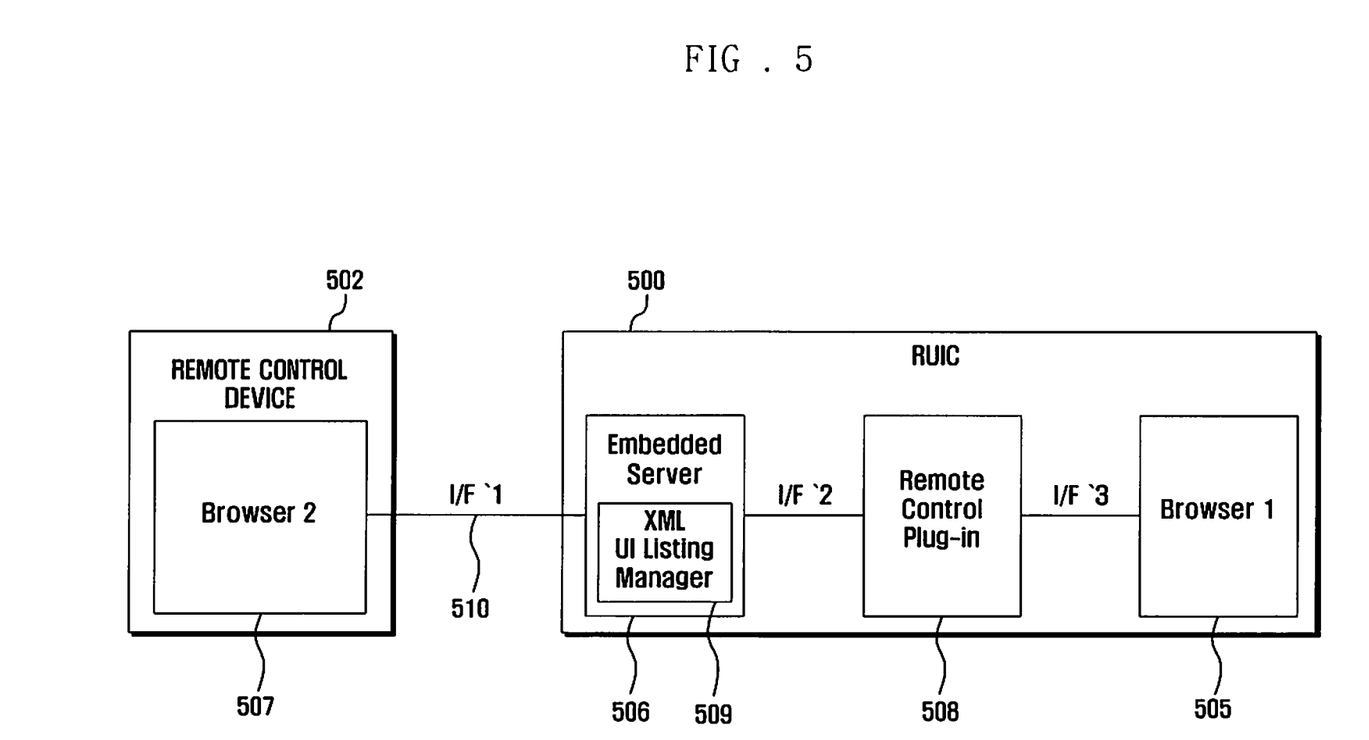
FIG. 5 is a diagram illustrating a system for providing a remote control device with default CUIs and a specialized CUI in a differentiated manner, according to an embodiment of the present invention.

Referring now to FIG. 5, a diagram illustrates a system for providing a remote control device with default CUIs and a specialized CUI, according to an embodiment of the present invention. An RUIC 500 is shown having an embedded server 506 in communication with a remote control plug-in 508 via interface 2, and a first browser 505 in communication with the remote control plug-in 508 via interface 3. A remote control device 502 is shown having a second browser 507.

Figure 6:
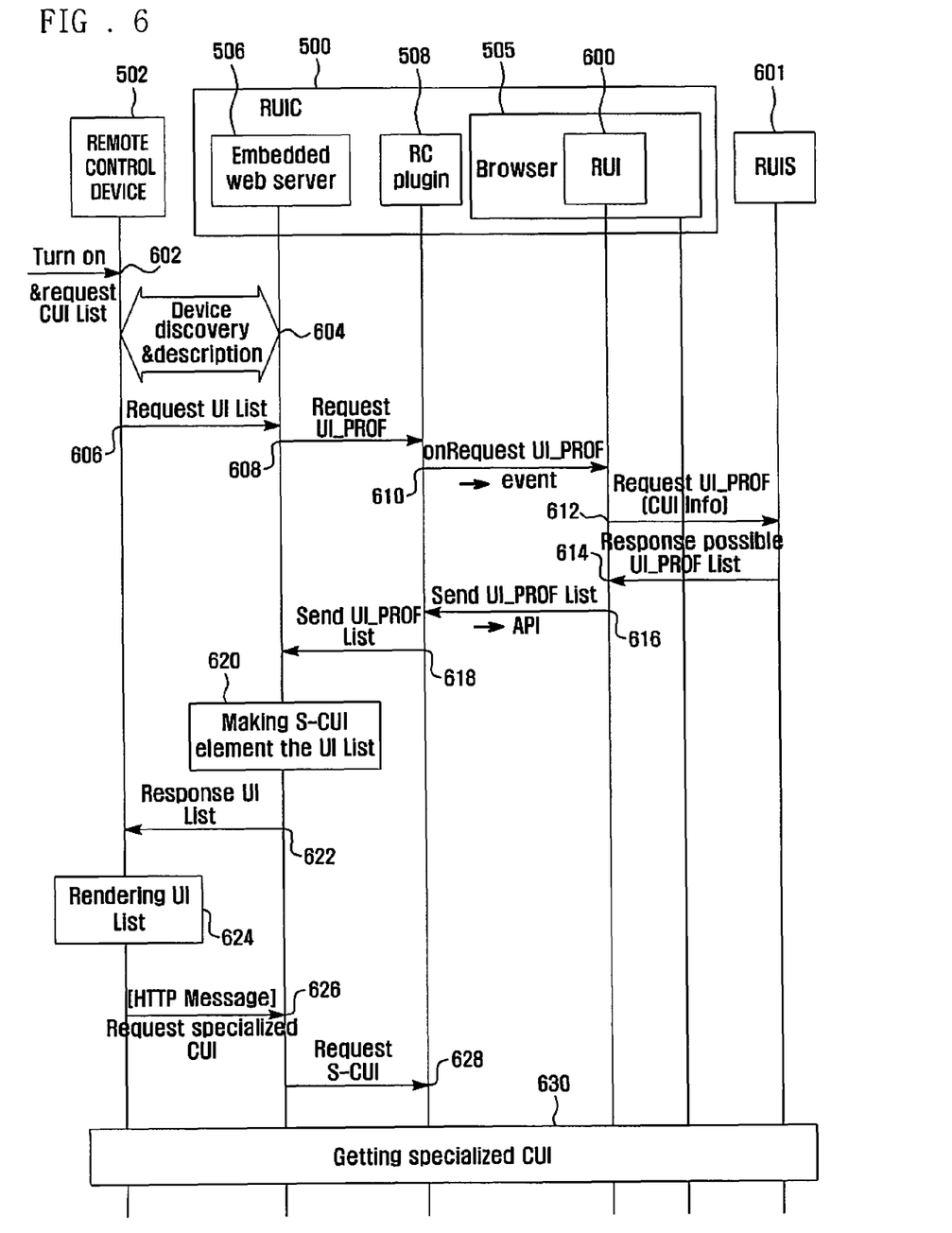
FIG. 6 is a diagram illustrating a specialized CUI acquisition method, according to an embodiment of the present invention.

FIG. 6 is a diagram illustrating a specialized CUI acquisition method, according to an embodiment of the present invention. After the remote control device 502 is turned on and a request for a CUI list is received from a user in step 602, the remote control device 502 commences a process for discovering the RUIC 500 and retrieving description information from the RUIC 500 in step 604. A detailed description of step 604 is provided below with respect to FIG. 7.

When a UI list request is received from the remote control device 502 at the embedded server 506 of the RUIC 500 in step 606, the embedded server 506 sends a request to the remote control plug-in 508 for a UI profile of a specialized CUI for controlling a RUI 600 currently running the RUIC 500 in step 608. The requested UI profile contains information regarding the compatible resolution of the specialized CUI and functions supported by the specialized CUI. The UI profile request is transferred in the form of an event from the remote control plug-in 508 to the RUI 600 currently running in the RUIC 500 in step 610. The RUI 600 forwards the request message to an RUIS 601 along with information on the specialized CUI that can control the currently running RUI 600 in step 612.

The RUIS 601 transmits the UI profile information appropriated for the specialized CUI and the RUI 600 to the RUI 600 in step 614. The UI profile information is transferred from the RUI 600 to the remote control plug-in 508 via an associated process, such as an application programming interface (API) in step 616, and then from the remote control plug-in 508 to the embedded server 506 in step 618. The embedded server 506 builds an element related to the specialized CUI and generates an XML UI list in step 620 that is provided to the remote control device 502 in step 622. A detailed description of the XML UI list is provided below with reference to FIG. 8.

In step 624, the remote control device 502 parses the XML UI list, and extracts a value of a <ui_profile> element for the specialized CUI and compares the <ui_profile> element value with its own UI_PROFILE. Specifically, the remote control device 502 determines whether it is capable of running the specialized CUI. If the profiles match, the remote control device 502 displays the UI list. In addition to the <ui_profile> element value relating the specialized CUI, element values relating to default CUIs can also be acquired from the XML UI list.

The user selects a button provided by the CUI that is currently presented on the remote control device 502 in order to acquire a specialized CUI. The button provided in the currently presented CUI is linked to a predetermined Hyper-Text Transfer Protocol (HTTP) address at the CUI generation state. Thus, the selection of the button results in an HTTP protocol message requesting the specialized CUI that is transmitted via the interface between the remote control device 502 and the RUIC 500 to the embedded server 506 in step 626. The embedded server 506 forwards the request to the remote control plug-in 508 in step 628. Thus, by clicking the button designated for calling the specialized CUI, the user can acquire the specialized CUI from an RUIS 601 via the RUIC 500 in step 630.

Figure 7:
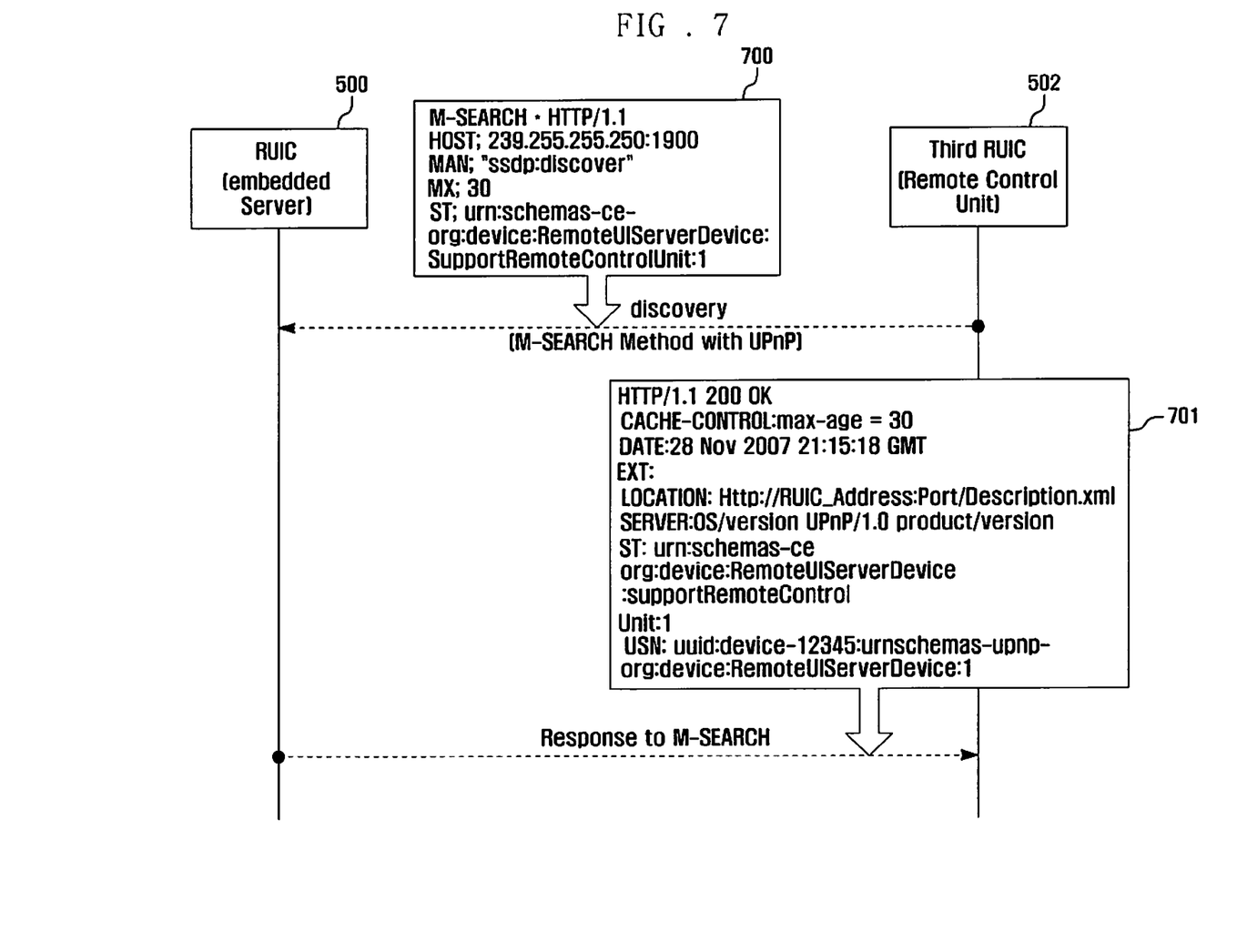
FIG. 7 is a diagram illustrating a procedure for discovering an RUIC and acquiring description information, according to an embodiment of the present invention.

Referring now to FIG. 7, a diagram illustrates a procedure for a remote control device to discover an RUIC and obtain description information, according to an embodiment of the present invention. Once the remote control device 502 is switched on, it discovers the RUIC 500 by transmitting an M-SEARCH message 700. The RUIC 500 responds to the remote control device 502 via an M-SEARCH response message 701 that provides description information based on location information. Through the description information, the remote control device 502 is able to extract the UI list URL. This further enables to the remote control device 502 to request and receive the XML UI list from the embedded server 506 in XML format or in the form of a modified UI. The XML UI list includes information on the CUIs that the embedded server 506 of the RUIC 500 can provide.

Figure 8:
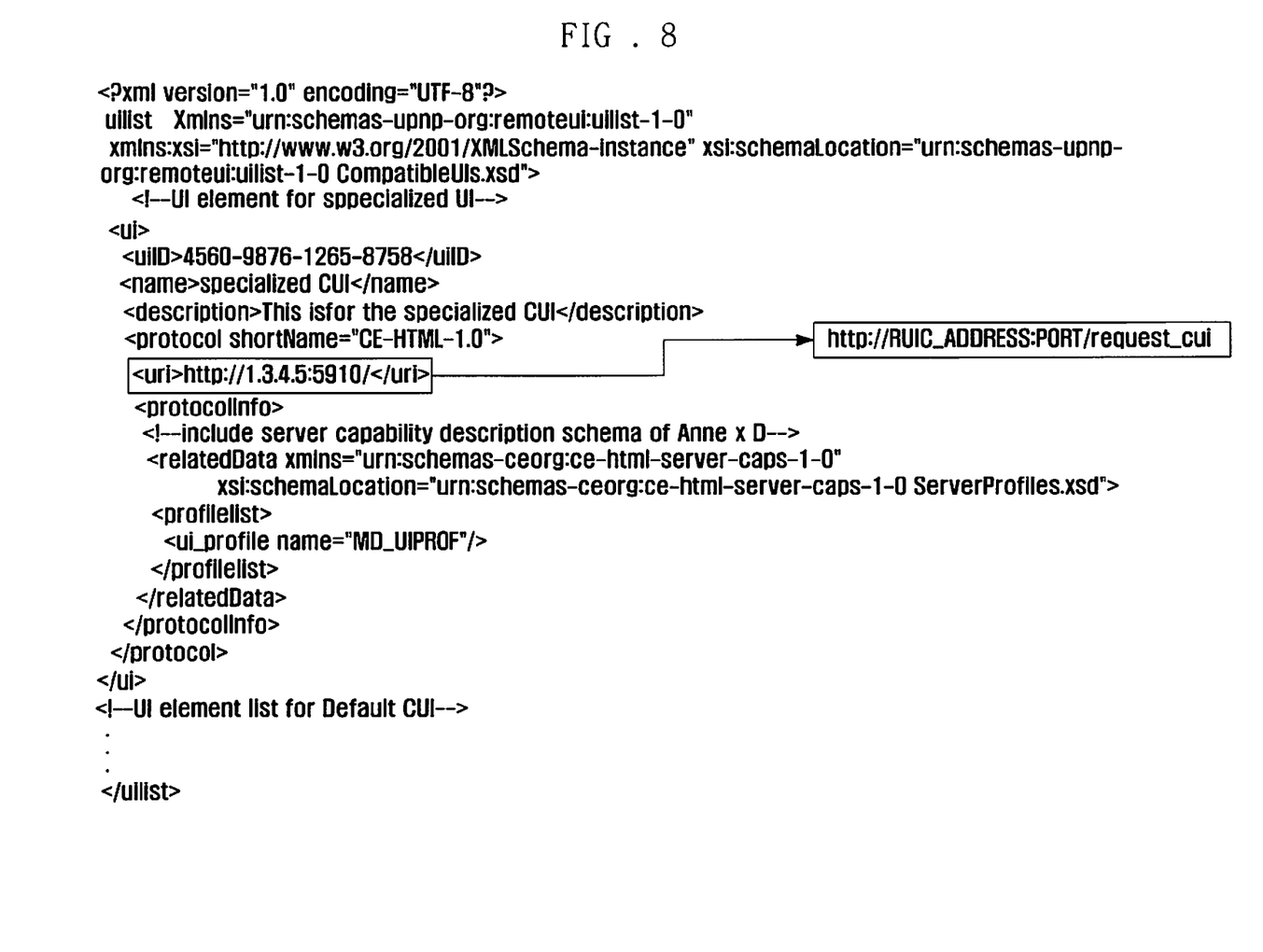
FIG. 8 is an XML format that allows for discovery of a CUI list by a remote control device, according to an embodiment of the present invention.

An XML UI list format for that provides the remote control device with access to the specialized CUI is defined as shown in FIG. 8. The XML UI list format is managed by an XML UI listing manager 509 of the embedded server 506 in the RUIC 500. In order for the XML UI listing manager 509 to generate the XML UI list format shown in FIG. 8, a specialized CUI-related element, <ui> element, is added. The <ui> element has the same XML schema as the conventional <ui> element, but includes a <uri> element that carries the Uniform Resource Identifier (URI) value of the HTTP protocol used on an interface 510 between the remote control device 502 and the RUIC 500. Also, the name attribute of the <ui_profile> element has a value received from the RUTS.

The remote control device 502 can call for a specialized CUI using an HTTP get message such as URL://RUIC_ADDRESS:PORT/request_cui via the interface 510 between the remote control device 502 and the RUIC 500. The specialized CUI is provided with the RUI from the RUIS and allows a user to control the RUI presented in the first browser 505 running in the RUIC 500. When an RUI has multiple CUIs, the remote control device 502 can call for the target CUI via a message such as URL://RUIC_ADDRESS:PORT/request_cui?cui_name=<target cui name>, and having parameters such as the name of the target CUI or a CUI Identifier (ID).

According to an embodiment of the present invention, the specialized CUI is acquired by the remote control device 502 when the RUIC 500 provides a CUI list to the third RUIC 502 along with information on the specialized CUI. The user is then able to call the specialized CUI via the remote control device 502 quickly without a default CUI-involved intermediate process.

Figure 9:
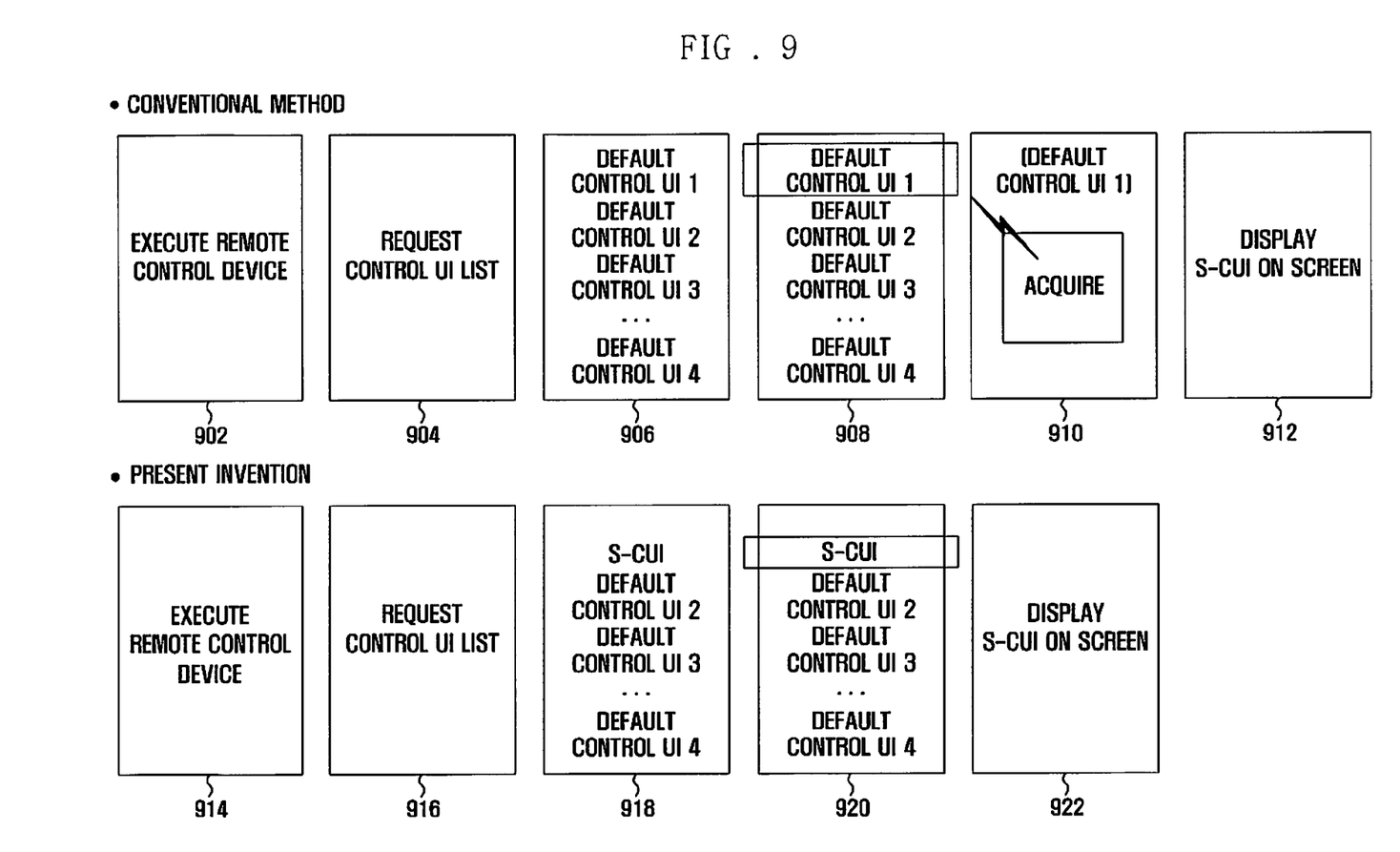
FIG. 9 is a diagram illustrating a conventional specialized CUI acquisition method and a specialized CUI acquisition method according to an embodiment of the present invention.

Referring now to FIG. 9, a diagram illustrates a conventional specialized CUI acquisition method and a specialized CUI acquisition method according to an embodiment of the present invention. In the conventional CUI acquisition method, the remote control device 502 is executed in step 902, and a CUI list is requested by the remote control device 502 in step 904. The RUIC 500 creates an XML UI list having only default CUIs in step 906 and transmits the XML UI list to the remote control device 502 in step 908. A user of the remote control device 502 selects a default CUI for the remote control device 502. The remote control device 502 then uses the activated default CUI to acquire a specialized CUI in step 910. In step 912, the specialized CUI is displayed on a screen of the remote control device 502.

In the specialized CUI acquisition method of the present invention, the remote control device 502 is executed in step 912, and a CUI list is requested by the remote control device 502 in step 914. When a CUI list is requested by the remote control device 502, the RUIC 500 creates an element containing the specialized CUI information. The RUIC 500 creates an XML UI list having default CUIs and a specialized CUI in step 916 and transmits the XML UI list to the remote control device 502 in step 918. The user is then able to select the specialized CUI from the XML UI list and the specialized CUI is displayed on a screen of the remote control device 502 by parsing the XML format. Accordingly, the user may select and acquire a specialized CUI from the CUI list displayed on the screen in a single selection step.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for acquiring a specialized Control User Interface (CUI) in a remote control device of a home network, comprising the steps of:
   transmitting a first message to a client requesting a User Interface (UI) list;
   receiving the UI list from the client, wherein the UI list comprises information on default CUIs for the client and information on a specialized CUI, which is received from a server and controls a Remote User Interface (RUI) currently running in the client;
   displaying the UI list on the remote control device when the remote control device is capable of running the specialized CUI;
   receiving, from a user of the remote control device, a selection of the information on the specialized CUI from the displayed UI list;
   transmitting a second message to the client requesting the specialized CUI in accordance with the information on the specialized CUI in the UI list; and
   receiving the specialized CUI from the server via the client in response to the second message.

2. The method of claim 1, further comprising:
   transmitting a search message to discover the client; and
   receiving a search response message from the client comprising description information relating to the UI list.

3. The method of claim 2, wherein a format of the UI list is an eXtensible Markup Language (XML) format.

4. The method of claim 1, wherein the specialized CUI information in the UI list comprises a Uniform Resource Identifier (URI) value for use over an interface between the remote control device and the client.

5. The method of claim 1, wherein displaying the UI list comprises:
   parsing the UI list to extract at least a profile element of the specialized CUI;
   comparing the profile element of the specialized CUI to a profile of the remote control device; and
   displaying the UI list when the profile element of the specialized CUI matches the profile of the remote control device.

6. The method of claim 1, wherein transmitting the second message comprises:
   transmitting a HyperText Transfer Protocol (HTTP) message as the second message to the client.

7. A method for acquiring a specialized Control User Interface (CUI) for a remote control device at a client of a home network, comprising the steps of:
   receiving a first message from the remote control device requesting a User Interface (UI) list;

generating the UI list comprising information on default CUIs for the client and information on a specialized CUI, which controls a Remote User Interface (RUI) currently running in the client, wherein the UI list is received from a server;

transmitting the UI list to the remote control device;

receiving a second message from the remote control device requesting the specialized CUI in accordance with the information on the specialized CUI in the UI list, when the remote control device is capable of running the specialized CUI and a user of the remote control device selects the information on the specialized CUI from the UI list; and acquiring the specialized CUI for the remote control device from the server.

8. The method of claim 7, wherein generating the UI list comprises:

transmitting a request for UI profile information relating to the specialized CUI for controlling a UI of the client to a server;

receiving the UI profile information relating to the specialized CUI from the server; and generating the UI list comprising the information on the specialized CUI in accordance with the received UI profile information.

9. The method of claim 8, wherein the first message is received at an embedded server of the client.

10. The method of claim 9, wherein transmitting a request comprises:

relaying a request for UI profile information from the embedded server to a remote control plug-in and a UI of the client; and transmitting the request for UI profile information from the UI to the server.

11. The method of claim 10, wherein the request for UI profile information is transferred from the remote control plug-in to the UI of the client in the form of an event.

12. The method of claim 10, wherein the request for UI profile information is transmitted from the UI to the server with the information on the specialized CUI that can control the UI.

13. The method of claim 9, wherein receiving the UI profile information comprises:

receiving the UI profile information appropriated for the specialized CUI and a UI of the client from the server at the UI; and relaying the UI profile information from the UI to a remote control plug-in and the embedded server of the client.

14. The method of claim 13, wherein the UI profile information comprises information relating to compatibility of the specialized CUI.

15. The method of claim 8, wherein generating the UI list comprises building an element related to the specialized CUI.

16. The method of claim 7, wherein receiving the second message comprises:

receiving a HyperText Transfer Protocol (HTTP) message requesting the specialized CUI as the second message at an embedded server of the client; and transferring the request for the specialized CUI from the embedded server to a remote control plug-in of the client.

17. A remote control device of a home network comprising:

a transmitter for transmitting a first message to a client requesting a User Interface (UI) list, and a second message to the client requesting a specialized CUI in accordance with information on the specialized CUI in the UI list to acquire the specialized CUI from a server via the client;

a receiver for receiving the UI list from the client, wherein the UI list comprises information on default CUIs for the client and the information on the specialized CUI, which is received from the server and controls a Remote User Interface (RUI) currently running in the client, and receiving the specialized CUI from the server via the client; and a controller for displaying the UI list when the remote control device is capable of running the specialized CUI, and receiving, from a user of the remote control device, a selection of the information on the specialized CUI from the displayed UI list.

18. A client of a home network comprising:

an embedded server for receiving a first message from a remote control device requesting a User Interface (UI) list, generating the UI list comprising information on default CUIs for the client and the information on a specialized CUI, which is received from a server and controls a Remote User Interface (RUI) currently running in the client, transmitting the UI list to the remote control device, receiving a second message from the remote control device requesting the specialized CUI in accordance with the information on the specialized CUI in the UI list when the remote control device is capable of running the specialized CUI and a user of the remote control device selects the information on the specialized CUI from the UI list, and acquiring the specialized CUI from the server for the remote control device.

19. A system for acquiring a specialized Control User Interface (CUI) comprising:

a remote control device for transmitting a first message requesting a User Interface (UI) list, receiving the UI list, wherein the UI list comprises information on default CUIs for the client and information on a specialized CUI, which is received from a server and controls a Remote User Interface (RUI) currently running in the client, displaying the UI list on the remote control device when the remote control device is capable of running the specialized CUI, receiving, from a user of the remote control device, a selection of the information on the specialized CUI from the displayed UI list, transmitting a second message requesting the specialized CUI in accordance with information on the specialized CUI in the UI list, and receiving the specialized CUI in response to the second message;

a client for receiving the first message from the remote control device, generating the UI list, transmitting the UI list to the remote control device, receiving the second message from the remote control device, and acquiring the specialized CUI for the remote control device from the server; and the server for providing the information on the specialized CUI for the generation of the UI list and providing the specialized CUI for the remote control device via the client.

* * * * *